May 29, 1934.  G. L. LASETER  1,961,054
ARTICLE SUPPORTING BRACKET
Filed Aug. 31, 1933
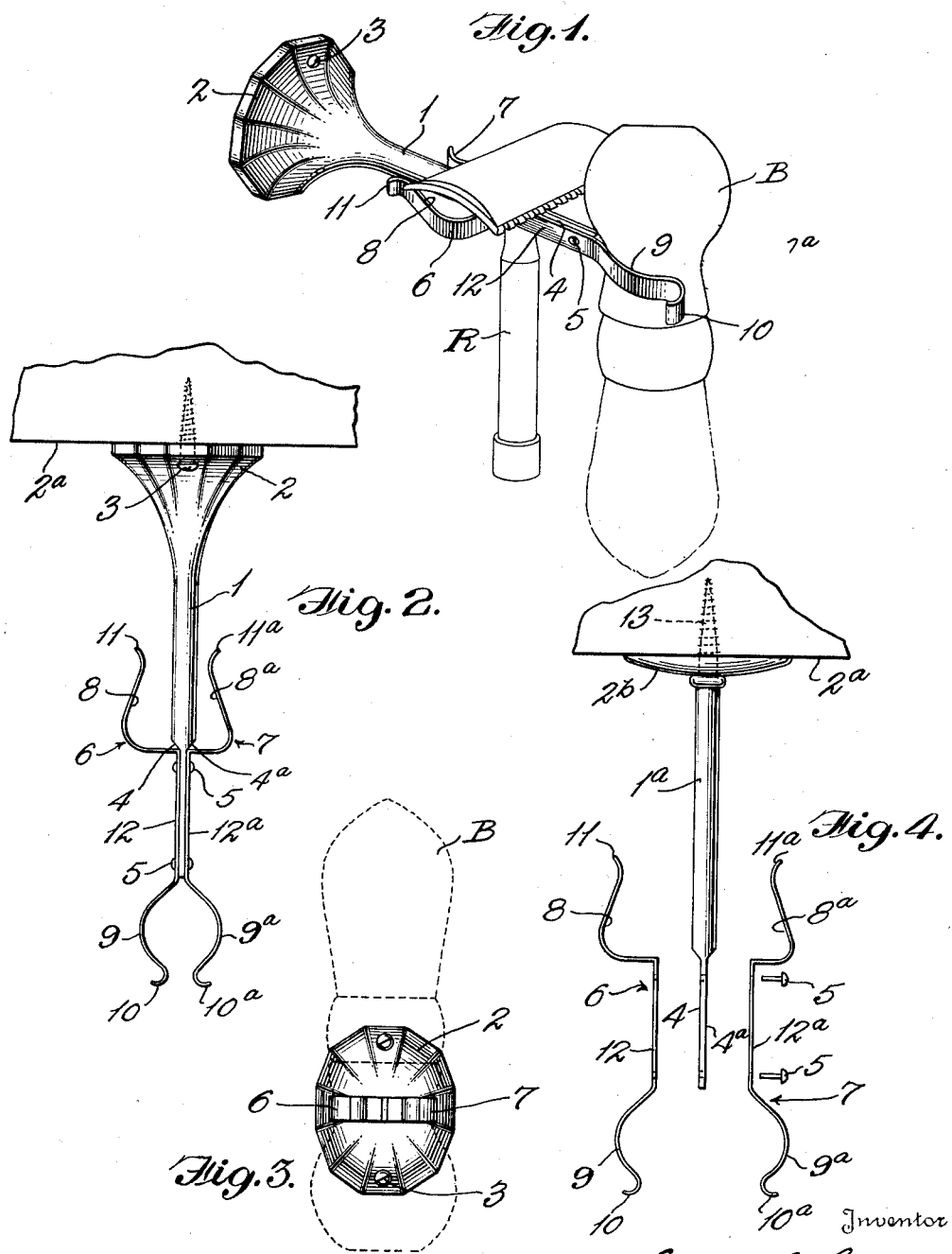

Patented May 29, 1934

1,961,054

UNITED STATES PATENT OFFICE 1,961,054

ARTICLE SUPPORTING BRACKET

Glenn L. Laseter, Atlanta, Ga.

Application August 31, 1933, Serial No. 687,673

1 Claim. (Cl. 248—49)

The invention relates to article supporting brackets and has for its objects to provide certain new and useful improvements in devices of this character.

More particularly, the invention contemplates the provision of a device for conveniently storing shaving equipment, such as a razor and brush, in a sanitary manner and within convenient reach, both as an incident to and subsequent to use.

The device is designed to be attached to a wall or supporting surface, for example in the bathroom or any other locality where the shaving equipment is likely to be stored and used.

A further object of the invention is to provide a support of the character described which is composed of few parts, efficient and durable in use and which may be conveniently installed and manufactured at small cost.

With such objects in view, as well as other advantages which may be incident to the use of the improvements, the invention consists in the use of the parts and combinations thereof hereinafter set forth and claimed, with the understanding that the several necessary elements constituting the same may be varied in proportions and arrangement without departing from the nature and scope of the invention.

In order to make the invention more clearly understood there are shown in the accompanying drawing means for carrying the same into practical effect, without limiting the improvements, in their useful applications, to the particular constructions which, for the purpose of explanation, have been made the subject of illustration.

In said drawing:

Fig. 1 is a perspective view of the bracket device constituting the invention.

Fig. 2 is a top plan view of the same with the articles removed.

Fig. 3 is a front elevation of the device.

Fig. 4 is a view similar to Fig. 2 of a slightly modified structure and showing the component parts in supported position.

Referring to the drawing, the support comprises a body member or projecting stem 1, constructed of any suitable material, but preferably of cast or forged metal and which may be of any desired cross-sectional contour. For the purpose of illustration the stem member 1 has been shown as substantially cylindrical and terminates at its inner end in an outwardly flared apertured base portion 2 to adapt the device to be removably secured to a wall or supporting surface 2ª as by screws 3 or other fastening means. The outer end of the body member is preferably cut away on its opposite sides in a vertical plane as shown at 4, 4ª to provide opposed flat surfaces extending inwardly along a portion of the member 1 adjacent the outer extremity thereof. The described flattened portion of the bracket is suitably apertured to receive screws 5 or other fastening elements for the purpose of removably securing thereto a pair of complemental opposed leaf or other spring members indicated at 6 and 7. Said spring elements may consist of flat tempered steel leaf springs or they may be of round or other desired cross-sectional diameter, it being desirable that the same be formed of spring metal bent into substantially the contour illustrated. The inner end of each spring element is bent outwardly and thence inwardly to constitute with the stem portion 1 resilient supporting loops or recesses 8, 8ª. The outer ends of the said spring elements are bent outwardly and thence inwardly as indicated at 9, 9ª to cooperate with one another in forming a resilient supporting recess for the removable reception of an article such as a shaving brush B or the like. By reversely curving the outer extremities of the spring members 6 and 7, as shown at 10, 10ª, convenient insertion and removal of the brush B is facilitated as and when desired. Similarly the inner extremity of each spring member 6 and 7 is outwardly flared or turned as at 11, 11ª to insure the ready insertion and removal of a second article, illustrated for example as consisting of a razor R.

It will be noted that the portion 8 of the spring member 6 is so fashioned as to constitute with the stem 1 a somewhat larger resilient support than is afforded by stem 1 and the corresponding portion 8ª of spring member 7. This is to provide means for supporting razors having handles of varying diameters, the handle portion of the razor implement being preferably resiliently engaged by and supported between the stem 1 and the curved portion 8, or 8ª of one of the spring elements.

The intermediate portions 12, 12ª of the spring members are designed to lie flush against the oppositely disposed flattened portions 4, 4ª of the stem and are removably secured in position on the stem by means of the screws or other fastening elements 5.

From the foregoing it will be apparent that I have provided a simple, economical and efficient device for conveniently supporting various articles, preferably shaving equipment, in a locality where the same are intended to be used and stored. The device is designed to accommodate razors of various sizes as above explained and may be easily installed and removed when desired. The outer spring supporting portion of the device is designed to support the shaving brush B in inverted position (Fig. 1) when not in use and also to support the brush in reverse position (Fig. 3) for convenient access when lathered during the shaving operation.

In this respect the device is of a sanitary as well as convenient nature, since the brush is supported at all times out of contact with the basin or other fixtures and is maintained against accidental dropping on the floor. When in inverted position the brush does not easily accumulate dust and is permitted to dry rapidly. Similarly the razor R is maintained against misplacement and in a position to be free from dust and the like, while at all times being conveniently accessible.

While I have illustrated and described the improvements as designed for shaving equipment, it will be obvious that the support is equally adapted for storing other articles, such as toothbrushes, tooth paste or shaving cream tubes and various other articles, without departure from or substantial modification in the principle of operation.

The tension of the spring members, as will be apparent, may be varied as desired by manual adjustment.

In Fig. 4 I have shown a slightly modified form wherein the stem member $1^a$ is provided on its inner end with a screw threaded portion 13 and is adapted to be inserted through a separate supporting base member $2^b$ of circular or any desired configuration. The screw threaded inner end of the stem or body member may be turned directly into the wall until the base plate is clamped between the stem and the wall as will be obvious.

If desired, the device may be installed inside of or against the inner wall of a medicine cabinet or the like in a bathroom so as to effectively guard against any accumulation of dust on the articles supported thereby. In use the respective components of shaving equipment or other articles, are preferably supported in the manner and at the locations illustrated.

Any of the lighter metals, such as aluminum, may be employed in the manufacture and design of the support. The spring members 6 and 7 are preferably constructed of flexible high-quality spring steel and may be nickel-plated to provide a finished appearance. Instead of employing screws 5 as fastening elements, the spring members may be riveted, spot welded or otherwise permanently secured to the outer portion of the stem 1 to constitute a complete and unitary fixture.

By making the device smaller or larger, without departing from the essential features of construction, it may be adapted for removably supporting articles of various sizes and weight, thereby rendering the device suitable for holding diverse articles in the home or on display in store windows or show cases.

It will be obvious that changes and minor structural deviations may be made in the illustrated embodiment of the device without departing from the nature and scope of my invention as hereinafter claimed.

What I claim is:

In an article supporting device, the combination of a bracket member having one end adapted to be secured to a wall or other supporting surface, and a pair of elongated resilient members one secured on each side of said bracket member adjacent the outer end thereof and substantially parallel thereto, the outer ends of said resilient members projecting beyond the outer end of said bracket member and being oppositely deformed so as to provide yieldable article receiving portions opening outwardly from and axially of said bracket member, the inner ends of said resilient members each being spaced from the inner end of and deformed outwardly away from said bracket member to provide a pair of yieldable article receiving portions each cooperating with said bracket member and opening toward the inner end thereof, whereby the outer deformed portions of said resilient members are adapted to receive and yieldably support an article projected therebetween in a direction towards the wall or supporting surface, and the inner deformed portions of said resilient members are adapted to receive and support one or more articles projected therebetween in a direction away from said wall.

GLENN L. LASETER.